(12) United States Patent
Kim et al.

(10) Patent No.: US 7,684,358 B2
(45) Date of Patent: Mar. 23, 2010

(54) METHOD FOR PROVIDING INTERACTIVE DATA SERVICE IN A MOBILE COMMUNICATION SYSTEM

(75) Inventors: Dae-Gyun Kim, Songnam-shi (KR); Yong Chang, Songnam-shi (KR); Chang-Hoi Koo, Songnam-shi (KR); Jung-Soo Jung, Seoul (KR); Beom-Sik Bae, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 1082 days.

(21) Appl. No.: 10/658,483

(22) Filed: Sep. 9, 2003

(65) Prior Publication Data
US 2004/0053619 A1    Mar. 18, 2004

(30) Foreign Application Priority Data
Sep. 13, 2002    (KR)    ............... 10-2002-0055688

(51) Int. Cl.
*H04K 3/00* (2006.01)
(52) U.S. Cl. ............ 370/312; 455/452.1; 455/518
(58) Field of Classification Search .......... 370/329, 370/341, 331, 332, 312; 455/414.1–414.3, 455/420, 450–451, 452.2, 453, 452.1, 518
See application file for complete search history.

(56) References Cited

U.S. PATENT DOCUMENTS

| | | | |
|---|---|---|---|
| 6,144,651 A | | 11/2000 | Rinchiuso et al. |
| 6,519,461 B1* | | 2/2003 | Andersson et al. .......... 455/453 |
| 6,704,576 B1* | | 3/2004 | Brachman et al. ........... 455/503 |
| 6,882,850 B2* | | 4/2005 | McConnell et al. ......... 455/453 |
| 7,349,425 B2* | | 3/2008 | Leung et al. ................ 370/465 |
| 2002/0181423 A1* | | 12/2002 | Chen et al. .................. 370/337 |
| 2003/0036384 A1* | | 2/2003 | Chen et al. .................. 455/437 |
| 2003/0087653 A1* | | 5/2003 | Leung et al. ................ 455/502 |
| 2003/0134655 A1* | | 7/2003 | Chen et al. .................. 455/522 |
| 2003/0145064 A1* | | 7/2003 | Hsu et al. .................... 709/219 |
| 2008/0075099 A1* | | 3/2008 | Alao et al. ................... 370/401 |

FOREIGN PATENT DOCUMENTS

| | | |
|---|---|---|
| CN | 1286839 | 3/2001 |
| EP | 0 993 128 | 4/2000 |

(Continued)

OTHER PUBLICATIONS

International Search Report dated Dec. 19, 2003 issued in a counterpart application, namely, Appln. No. PCT/KR03/01869.

(Continued)

*Primary Examiner*—Kent Chang
*Assistant Examiner*—Brandon J Miller
(74) *Attorney, Agent, or Firm*—The Farrell Law Firm, LLP

(57) ABSTRACT

A method for providing an interactive data service between a base station and a mobile station in a mobile communication system including at least one mobile station, the base station communicating with the mobile station, and a server connected to the base station. The base station simultaneously transmits data transmitted from the server, to one or more mobile stations over a forward common channel. A particular mobile station receiving a service through the common channel transmits reverse transmission data over a dedicated channel.

24 Claims, 14 Drawing Sheets

FOREIGN PATENT DOCUMENTS

| | | |
|---|---|---|
| JP | 2000-138632 | 5/2000 |
| JP | 2002-165262 | 6/2002 |
| KR | 10-2003-0015113 | 2/2003 |
| KR | 10-2003-0021937 | 3/2003 |
| KR | 10-2003-0059699 | 7/2003 |
| WO | WO 00/74311 | 12/2000 |
| WO | WO 01/05080 | 1/2001 |
| WO | WO 01/31950 | 5/2001 |
| WO | WO 01/65869 | 9/2001 |
| WO | WO 02/056504 | 7/2002 |
| WO | WO 02/061976 | 8/2002 |
| WO | WO 02/080609 | 10/2002 |

OTHER PUBLICATIONS

European Search Report dated Jan. 7, 2004 issued in a counterpart application, namely, Appln. No. 03020806.0.

"CDMA2000", Jiangsu Communication Technology, vol. 17, No. 2, Apr. 2001.

Zhao Xiaojiang, et al., "CDMA2000 1x", Modern Science & Technology of Telecommunications, Apr. 2002.

* cited by examiner

METHOD FOR PROVIDING INTERACTIVE DATA SERVICE IN A MOBILE COMMUNICATION SYSTEM

PRIORITY

This application claims priority under 35 U.S.C. § 119 to an application entitled "Method for Providing Interactive Data Service in a Mobile Communication System" filed in the Korean Intellectual Property Office on Sep. 13, 2002 and assigned Serial No. 2002-55688, the contents of which are incorporated herein by reference.

BACKGROUND OF THE INVENTION

1. Field of the Invention

The present invention relates generally to a mobile communication system, and in particular, to a method for providing an interactive data service between a base station and a mobile station.

2. Description of the Related Art

In the next generation mobile communication, a matter of grave concern is high-speed data transmission. For example, 3GPP2 (3$^{rd}$ Generation Partnership Project 2) makes a study of a mobile communication system for high-speed data transmission, such as 1xEV-DV (1x Evolution Data and Voice). In a 3GPP2 mobile communication system, a broadcast service is taken into consideration for efficient resource management and various service media.

The broadcast service is a service in which a mobile station receives high-speed forward data from a base station without transmission of reverse feedback information to the base station. That is, a base station provides a broadcast service by simultaneously transmitting data to mobile stations at high speed. According to 3GPP2, a supplemental channel, which is a dedicated channel, is used for a broadcast service. The supplemental channel is a dedicated channel for which a common long code mask is used instead of a dedicated long code mask.

The 3GPP2 considers factors for preventing excessive consumption of cell capacity in a mobile communication system for high-speed data transmission. In order to prevent the excessive consumption of cell capacity, 3GPP2 proposes an autonomous handoff operation and an outer coding operation, in which a base station does not require feedback information from a mobile station. Although a dedicated channel is used in those operations, higher performance and lower power consumption are guaranteed as compared with when a common channel is used. When a broadcast service is provided using a common channel, excessive consumption of cell capacity is inevitable in order to guarantee the same performance even up to the cell boundary. In addition, 3GPP2 proposes a general concept of preventing a waste of reverse cell capacity by suppressing the use of a dedicated reverse channel for transmitting power control information and feedback information from a mobile station to a base station, thereby accommodating a great number of mobile stations within a cell.

As described above, no reverse channel is used for a broadcast service in a mobile communication system for high-speed data transmission proposed in 3GPP2. That is, because there are no means for delivering information from a mobile station to a base station, an interactive broadcast service cannot be provided.

SUMMARY OF THE INVENTION

It is, therefore, an object of the present invention to provide a method for supporting an interactive data service in a mobile communication system for high-speed data transmission.

It is another object of the present invention to provide a method for supporting a multimedia interactive data transmission service in a mobile communication system.

To achieve the above and other objects, there is provided a method for providing an interactive data service between a base station and a mobile station in a mobile communication system including at least one mobile station, the base station communicating with the mobile station, and a server connected to the base station. The method comprises the steps of: simultaneously transmitting by the base station data transmitted from the server, to one or more mobile stations over a forward common channel; and transmitting reverse transmission data over a dedicated channel by any one mobile station receiving a service through the common channel among the mobile stations.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail herein below with reference to the annexed drawings. In the following description, a detailed description of known functions and configurations incorporated herein has been omitted for conciseness.

Figure 1:
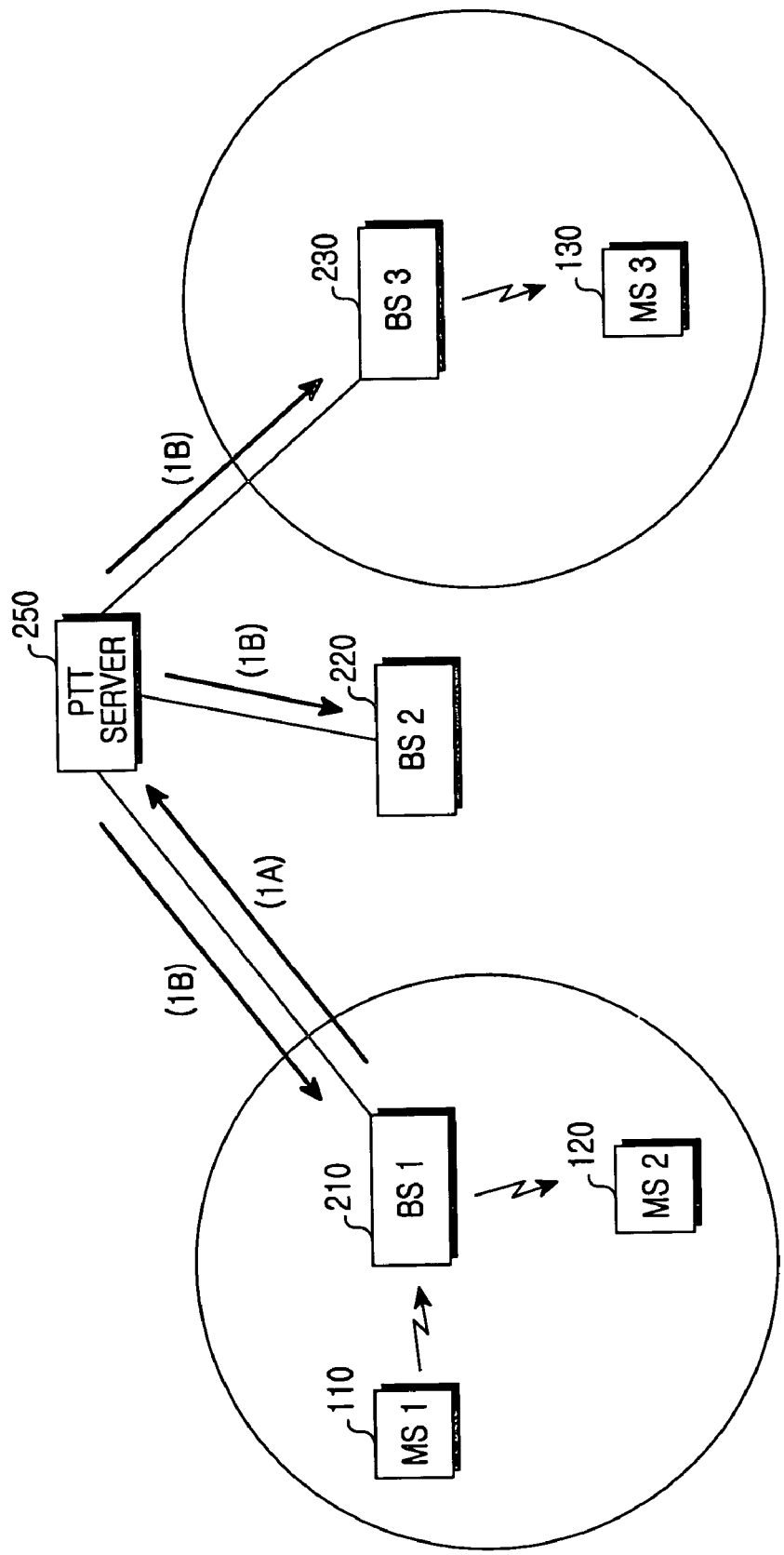
FIG. 1 illustrates a mobile communication system to which a multimedia interactive data service according to the present invention is applied.

A multimedia interactive data service according to the present invention is provided in a mobile communication system illustrated in FIG. 1. The mobile communication system includes a plurality of mobile stations (MSs) 110, 120 and 130, a plurality of base stations (BSs) 210, 220, and 230 in communication with the mobile stations 110, 120 and 130, and a pushed-to-talk (PTT) server 250 connected to the base stations 210, 220, and 230. A first mobile station (MS1) 110 and a second mobile station (MS2) 120 are located in a cell area (or coverage) of a first base station (BS1) 210, and no mobile station is located in a cell area of a second base station (BS2) 220. A third mobile station (MS3) 130 is located in a cell area of a third base station (BS3) 230. The PTT server 250 provides service data to the mobile stations 110, 120, and 130 via the base stations 210 and 230, and receives service data from the mobile stations 110, 120, and 130 via the base stations 210 and 230.

Referring to FIG. 1, the first mobile station (MS1) 110, which is one of several users belonging to a particular group, delivers desired information to the PTT server 250 via the first base station (BS1) 210 in a reverse direction (Step 1A). The PTT server 250 then simultaneously delivers the received information to the base stations 210, 220, and 230 (Step 1B). The base stations 210, 220 and 230 either immediately deliver the information received from the PTT server 250 to all available mobile stations 110, 120, and 130, or temporarily buffer the received information before transmission to the mobile stations 110, 120, and 130.

In an interactive data service (or broadcast service) according to the present invention, the PTT server 250 receives information transmitted by a certain one of a plurality of mobile stations via a corresponding base station, and transmits the received information to all mobile stations that can receive data from all base stations. Service data transmitted and received at this time includes various data supporting a multimedia service, such as moving images, still images, audio files, and texts. For information, in a general broadcast service, a start and an end of the service is not controlled by a user, but by a server or a system. Therefore, during a service, a user desiring to receive the service provides only the information about whether the service is received or not, to the server via a base station for accounting. Of course, a particular user is not affected by whether another user receives the service. However, an interactive broadcast or multicast service according to the invention can immediately deliver a user's intention or message to the server during the service. Therefore, in the interactive broadcast service, it is possible to reflect a user's intension in the broadcast contents and deliver a service desired by only a user in a particular group. In addition, because bi-directional transmission is available, only the users belonging to a particular group receive information transmitted by a certain user, thereby enabling information exchange between users.

A detailed description will now be made of several embodiments for providing an interactive data service according to the invention in the mobile communication system. Before the detailed description of the embodiments, the terms used in the foregoing and following descriptions are defined in Table 1. States to which a system transitions during the interactive data service according to the invention are defined in Table 2.

In the following description, the invention is characterized in that a mobile communication system supports a multimedia interactive data transmission service by assigning a dedicated channel. According to the present invention, a broadcast/multicast-type shared (or common) channel is used for forward transmission and a dedicated channel is used for reverse transmission so that each user's data and request can be transmitted. Herein, "forward transmission" is a transmission of service data from a base station to a mobile station, and "reverse transmission" is a transmission of service data from a mobile station to a base station. In addition, a "multicast stream" shown in the accompanying drawings is a broadcast service data transmitted over a forward common channel in the present invention, and a "broadcast stream" is a broadcast service data provided in the conventional technology. Data provided during a broadcast service, proposed by the present invention, will be represented by "DATA PUSH (M-FCH)" as well in the drawings according to their types. The broadcast service proposed by the present invention will also be called an "interactive data service" having the same meaning.

TABLE 1

| | |
|---|---|
| MS: | Mobile Station |
| BS: | Base Station |
| PTT: | Pushed To Talk |
| PPP: | Point-to-Point Protocol |
| SDP: | Session Description Protocol |
| MAC_ID: | Medium Access Control Identifier |
| ECAM: | Extended Channel Assignment Message |
| UHDM: | Universal Handoff Direction Message |
| CACH: | Common Assignment Channel |
| CPCCH: | Common Power Control Channel |
| M-FCH: | Multicast Fundamental Channel |
| R-FCH: | Reverse Fundamental Channel |
| DCCH: | Dedicated Control Channel |
| SCH: | Supplemental Channel |
| ACH: | Access Channel |
| PCH: | Paging Channel |
| PDM: | Protocol Data Unit |
| FCS: | Frame Check Sequence |
| EACAM: | Early Acknowledgement Channel Assignment Message |
| PCCAM: | Power Control Channel Assignment Message |
| MRSCAMM: | MAC(Medium Access Control) Reverse Supplemental Channel Assignment Mini-Message |
| ENC_IND: | Encapsulate Indicator |
| EXT_CH_IND: | Extended Channel Indicator |
| MSR_ID: | Multicast Service Reference Identifier |
| TCP_ACK: | TCP Acknowledgement |

TABLE 2

Traffic state or traffic channel state: a state in which a dedicated channel is connected.
Dormant state or standby state: a state in which a common channel is connected in a radio link and PPP remains in a wired link.
Semi-traffic state: a state in which a forward common channel and a reverse dedicated channel are connected.

Figure 2:
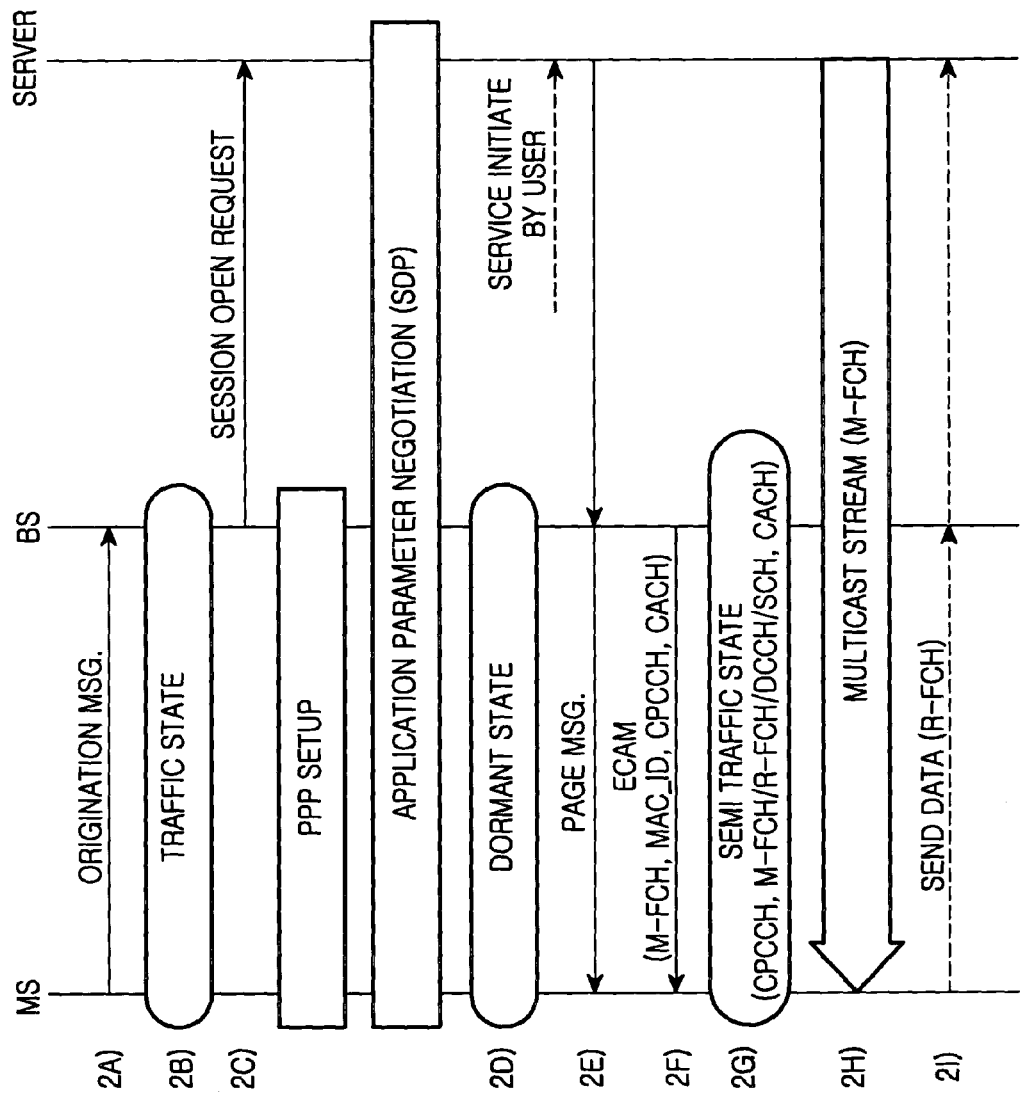
FIG. 2 illustrates a signal flow between a mobile station, a base station, and a server for an interactive data service according to an embodiment of the present invention.

FIG. 2 illustrates a signal flow between a mobile station, a base station, and a server for an interactive data service according to an embodiment of the present invention. Referring to FIG. 2, in step 2A, a mobile station (MS), as a first user for a particular service, transmits an origination message to a base station (BS) for service request. In step 2B, upon receiving the service request, the base station sets up connection to the mobile station that requested the service. At this point, a normal traffic state is given between the base station and the mobile station. In step 2C, the base station transmits to the server a session open request for requesting opening of a session to the server (or PTTserver) scheduled to perform a corresponding service. This step sets up a session for a new service when a mobile station desiring to receive a corresponding service is a first user. When the server accepts the session open request from the base station, a session is opened. Here, "session is opened" means that a process of setting up an application layer's environment for a corresponding service by a mobile station has been completed, and this process is divided into a PPP (Point-to-Point Protocol) setup process and a process of exchanging information (or parameters) necessary for an application service. When the session is opened, step 2D is performed. In step 2D, a traffic channel between the base station and the mobile station is released, and the mobile station transitions to a dormant state. Therefore, the mobile station in service is in a dormant state.

If a certain mobile station requests a service to the mobile station in a dormant state, the base station pages the mobile station in step 2E. In step 2F, the base station assigns a channel to the mobile station. For a channel assignment operation, an extended channel assignment message (ECAM) is transmitted from the base station to the mobile station. The extended channel assignment message transmits information for an interactive broadcast service, including M-FCH, MAC_ID, CPCCH, and CACH. Here, the M-FCH is a channel over which forward broadcast information is transmitted, and MAC_ID is information for identifying a mobile station and assigning reverse power control subchannel. In addition, CPCCH is information for assigning a common power control channel, and CACH is information for assigning a common assignment channel. When channels are assigned by the channel assignment message, a state between the base station and the mobile station becomes a semi-traffic state or sub-traffic state in step 2G. The semi-traffic state is a state in which a broadcast channel (or a common channel) is assigned in a forward direction and at the same time, a dedicated channel is assigned in a reverse direction as in steps 2H and 2I. Accordingly, in this state, a broadcast service can be performed in a forward direction and data transmission can be performed in a reverse direction.

Therefore, in the semi-traffic state, channels set up in a forward direction include a common power control channel for transmitting reverse power control information to a mobile station, and a time-sharing common assignment channel or dedicated channel, set up between a base station and a particular mobile station, for transmitting a response message for reverse data and a forward control message of an individual mobile station. Channels set up in a reverse direction include a reverse fundamental channel, a dedicated control channel, and a supplemental channel.

Further, in the semi-traffic state, power control on a reverse dedicated channel can be performed. As stated above, a reverse channel for an interactive broadcast service is a dedicated channel and thus, it needs power control. Unlike the exiting dedicated channel, a reverse dedicated channel is power-controlled through a common power control channel (CPCCH). A power control subchannel is assigned through a channel assignment message. A format of a common power control channel for an existing IS2000 system is used for a format of a common power control channel used herein. For example, 24 users are assigned to each common power control channel. If the number of users exceeds 24, a new common power control channel is needed. Mobile stations have their own unique reverse dedicated channels, and each dedicated channel is controlled by a power control subchannel value of CPCCH. Power control bits for 24 users are simultaneously transmitted during one power control group (PCG). A value of the CPCCH is available for soft handoff, thus contributing to an improvement in reception performance and power control performance at each mobile station.

Each mobile station transmits a power control bit in a reverse direction once for each PCG, and a base station tracks this value and uses the tracked value for power control of the CPCCH and a time-sharing common assignment channel (CACH) or forward dedicated control channel (F-DCCH). A reverse power control bit value of CPCCH is determined based on a forward power control bit transmitted from a mobile station at a previous PCG. In the case of time-sharing CACH or F-DCCH, when transmission is made to a corresponding mobile station, power control for transmission of the time-sharing CACH or F-DCCH can be performed based on a forward power control bit which was being tracked up to the previous PCG.

Such a power control method can be commonly applied in a semi-traffic state according to another embodiment of the present invention.

Figure 3:
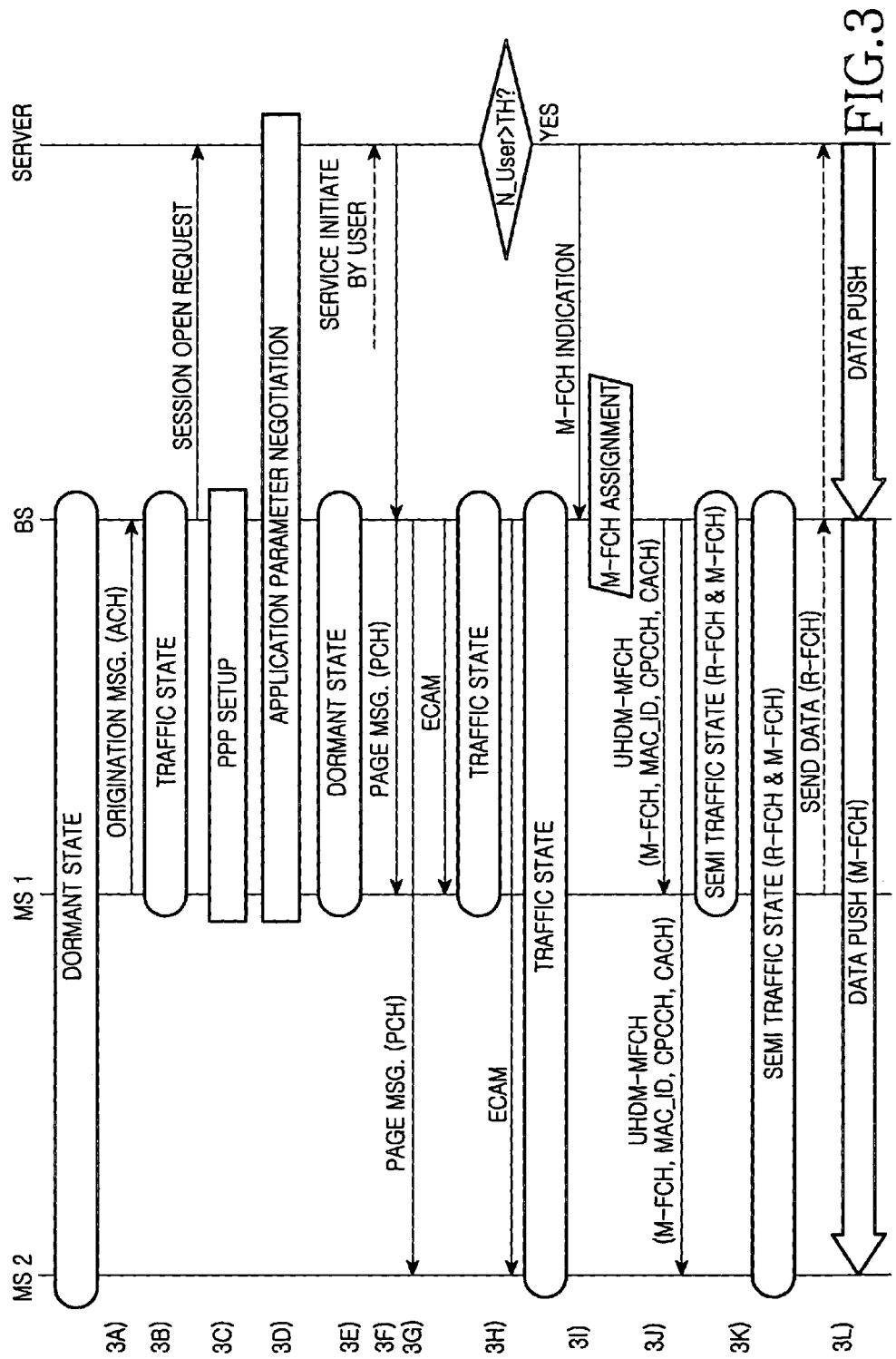
FIG. 3 illustrates a signal flow between a mobile station, a base station and a server for an interactive data service according to another embodiment of the present invention.

FIG. 3 illustrates a signal flow between a plurality of mobile stations, a base station and a server for an interactive data service according to another embodiment of the present invention. This embodiment illustrates a signal flow between elements for an operation in which a mobile station transmits data over a common channel according to the number of mobile stations receiving a service while transmitting data to a base station over a dedicated channel. In particular, this embodiment is applied when an interactive broadcast service capable of supporting real-time data such as voice is provided. In this embodiment, it is assumed that a second mobile station (MS2) is in a dormant state after already being registered in a base station.

Referring to FIG. 3, in sep 3A, a first mobile station (MS1) transmits an origination message to a base station over a reverse common channel for an interactive broadcast service. In step 3B, the base station and the first mobile station connect dedicated channels in both directions in order to support a data service. In step 3C, PPP connection is set up between the base station and the first mobile station for a packet service. In step 3D, the base station exchanges an application layer's session description protocol (SDP) necessary for an interactive broadcast service between the first mobile station and the server. The session description protocol includes information related to coding and encryption.

Thereafter, when the first mobile station completes reception of the session description protocol over an interactive dedicated channel and ends a process of registering the received session description protocol in a corresponding service, the first mobile station releases a dedicated channel until there is transmission/reception data, and transitions to a dormant state in step 3E to await a start of the service. If a service start request by a user subscribed to the service is received in step 3F, the base station transmits a page message to the first mobile station and the second mobile station in step 3G. In step 3H, the base station connects a dedicated channel between the first mobile station and the second mobile station, and then performs a service. To this end, the base station transmits a channel assignment message to the first mobile station and the second mobile station, so that the base station transitions from the dormant state to a traffic state. Therefore, initial service users perform services through a dedicated channel. Instead, the base station may assign a common channel to the first mobile station and the second mobile station according to a data rate or an operation method. That is, initial service users may immediately use a common channel in a dormant state. Thereafter, if the number N_User of users subscribed to the service is larger than a threshold TH, the server informs the base station of this fact in step 3I. Alternatively, an operation of determining whether to switch to a common channel according to the threshold is performed by the base station.

In step 3J, the base station assigns a common channel between the first mobile station and the second mobile station. For assignment of the common channel, a handoff direction message (UHDM) can be used. The UHDM is transmitted to a mobile station along with a common channel M-FCH over which forward broadcast information is transmitted, MAC_ID for identifying a mobile station and assigning a reverse link power control subchannel, information on a common power control channel CPCCH, and information on a common channel CACH. Upon receiving the UHDM, mobile stations change a forward channel to a common channel. Consequently, when a change from a common channel to a dedicated channel is made, a channel is closed, a new origination call is made, and a dedicated channel is connected. That is, in the semi-traffic state, while service data is being provided, the server compares the number of mobile stations requesting the service with a predetermined threshold. If the number of mobile stations receiving service data provided over the common channel is smaller than the threshold, the base station transmits service data provided from the server to one or more mobile stations requesting the service, over a dedicated channel.

Upon receiving the UHDM, in step 3K, the mobile stations release a forward dedicated channel and receive data over a common channel. This state is called a semi-traffic state in which a common channel is assigned in a forward direction and a dedicated channel is assigned in a reverse direction. In step 3L, data or a request generated in a mobile station is delivered to the base station and the server via a dedicated channel, and data from the base station is delivered to the base station over a common channel.

The interactive broadcast service can be realized in such a way that information transmitted by a mobile station is either immediately delivered to the other mobile station or delivered to the other mobile station after being temporarily stored through the server. At this point, a dedicated channel can be released and then newly set up each time data is generated, in order to save channel resources. However, this method can cause a problem in real-time data transmission for a real-time service such as voice, and cause capacity reduction due to frequent common channel messaging. In order to solve this problem, it is preferable that a reverse dedicated channel is maintained during the service. For various types of additional services, a VoIP (Voice over Internet Protocol) service is appropriate rather than the existing circuit-based voice service.

In addition, a method can be used in which a release command message is transmitted to a mobile station in order to change the data transmission channel from a base station to a mobile station from a dedicated channel to a common channel.

Figure 4:
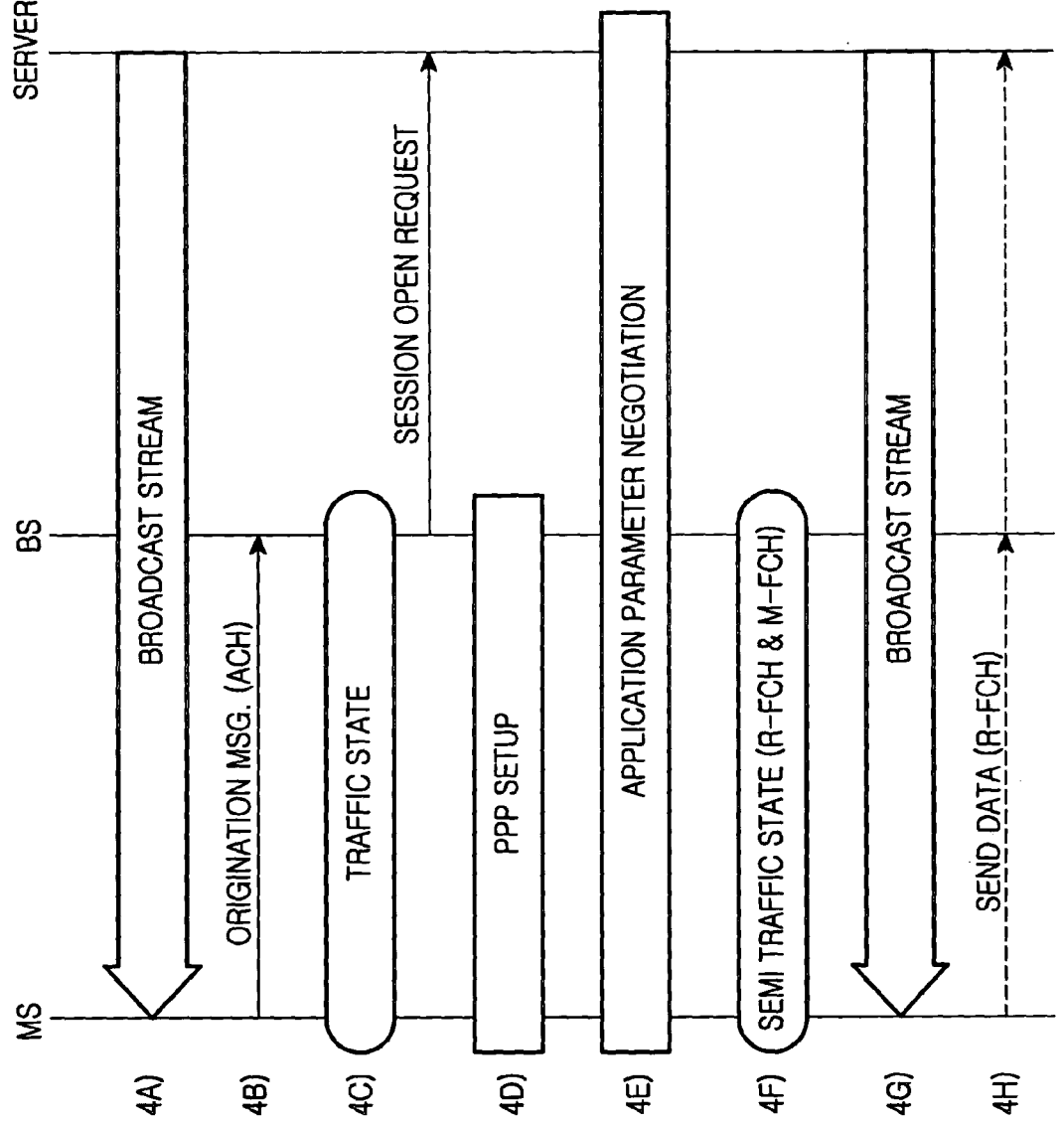
FIG. 4 illustrates a signal flow between a mobile station, a base station, and a server for an interactive data service according to yet another embodiment of the present invention.

FIG. 4 illustrates a signal flow between a mobile station, a base station, and a server for an interactive data service according to yet another embodiment of the present invention. This embodiment considers not only a case where data transmitted by a user is broadcasted, but also a case where the user desires to directly transmit his comment on the broadcast contents or his request to the base station or the server while receiving a forward broadcast service.

Referring to FIG. 4, in step 4A, a mobile station is receiving a general broadcast service. There is a case where a user desires to send his comment while receiving a broadcast service. In this case, the mobile station performs in step 4B a data service procedure through an origination message. In step 4C, a base station transitions to a traffic state after setting up a dedicated channel to the mobile station, and then sends a session open request to the server. In step 4D, the base station sets up PPP to the mobile station, and in step 4E, the base station exchanges various information necessary for an application service between the server and the mobile station. In step 4F, the base station releases a forward dedicated channel to the mobile station and then transitions to a semi-traffic state. After transitioning to the semi-traffic state, the base station informs the mobile station of its readiness. Thereafter, in steps 4G and 4H, the mobile station can transmit user's request or data to the server via the base station over a reverse dedicated channel while continuously receiving the broadcast service from the server.

For the interactive broadcast service, power control on a reverse dedicated channel is required. A common power control channel (CPCCH) defined in CDMA2000 (Code Division Multiple Access 2000) standard can be used for power control on a reverse dedicated channel. Several mobile stations can receive power control information from a base station by sharing one channel. In addition, forward data transmitted to maintain a reverse dedicated channel or small-sized data such as TCP_ACK for reverse data can be transmitted using a common assignment channel (CACH) defined in CDMA2000 standard. Of course, if a large amount of forward data is generated for which a forward dedicated channel is required, the forward dedicated channel is opened. Information for using the common power control channel or the common assignment channel is transmitted to a mobile station along with a UHDM message during common mode change. The common power control channel and the common assignment channel can be equally applied even in FIGS. 2 and 3.

Figure 5:
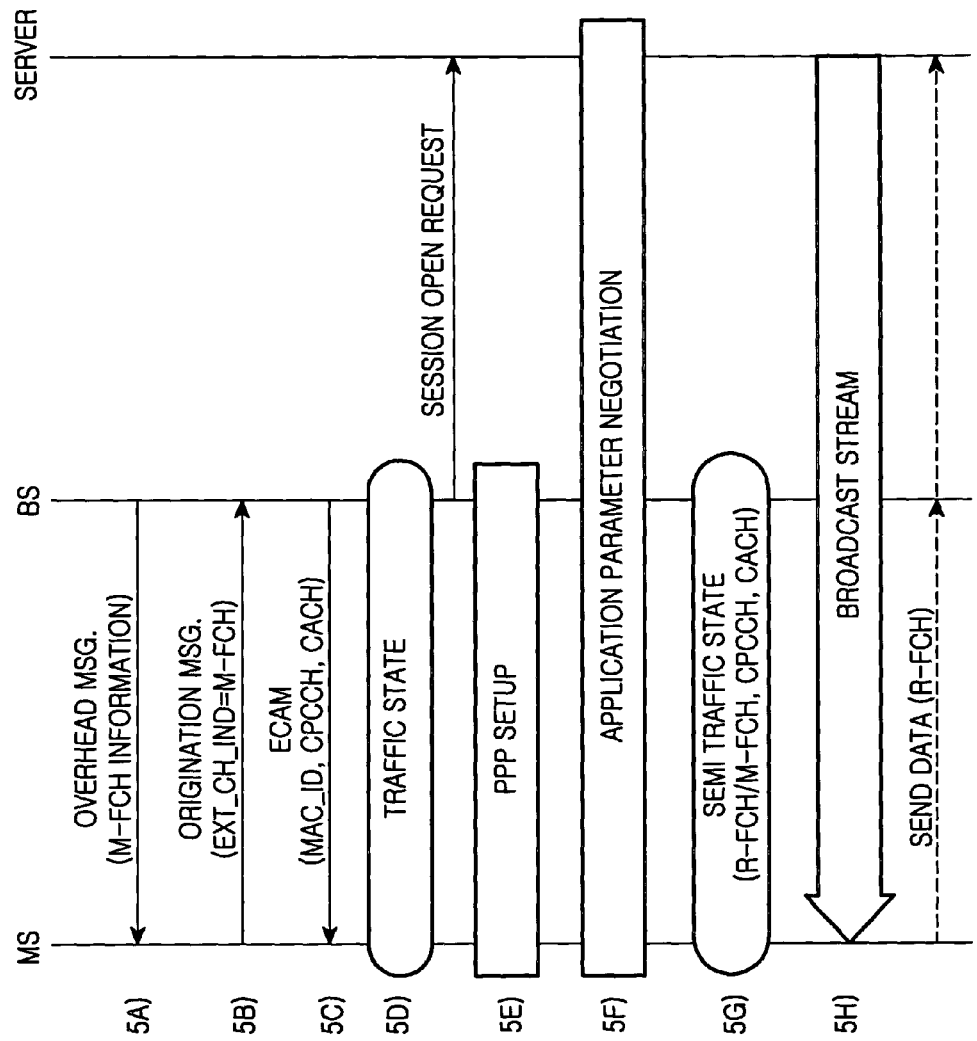
FIG. 5 illustrates a signal flow between a mobile station, a base station and a server for an interactive data service according to another object of the present invention.

FIG. 5 illustrates a signal flow between a mobile station, a base station and a server for an interactive data service according to another object of the present invention. Specifically, FIG. 5 illustrates an operation in which an interactive data service is initiated at the request of a base station, not a mobile station, when the mobile station enters a particular building where the base station providing the interactive data service is located.

Referring to FIG. 5, in step 5A, a mobile station receives information on radio resources and their configurations for an interactive broadcast service through an overhead message from a base station. The overhead message includes LPM (Logical to Physical Mapping)/MUX (Multiplexing) rule/MSR_ID (Multicast Service Reference Identifier) information according to M-FCH. The MSR_ID is similar to BSR_ID in function. Thereafter, in step 5B, the mobile station, which is a first user for a particular service, transmits a service request to the base station through an origination message. By designating M-FCH to EXT_CH_IND included in the origination message, the mobile station can inform the base station that it desires to receive the interactive broadcast service. In step 5C, the base station sets up connection to the mobile station that requested the service. Here, ECAM includes MAC_ID, CPCCH, and CACH information. In step 5D, a traffic channel is assigned between the base station and the mobile station, and the base station that received the service request sends a session open request to a server (PTT server)

scheduled to perform a corresponding service. As a result, in steps 5E and 5F, a session between the mobile station and the base station is opened. In step 5G, the base station releases a forward dedicated channel to the mobile station, and then transitions to a semi-traffic state where a common channel is received. Accordingly, in step 5H, the mobile station can receive broadcast information from the base station over a forward common channel, and transmit information to the base station over a reverse dedicated channel.

Figure 6:
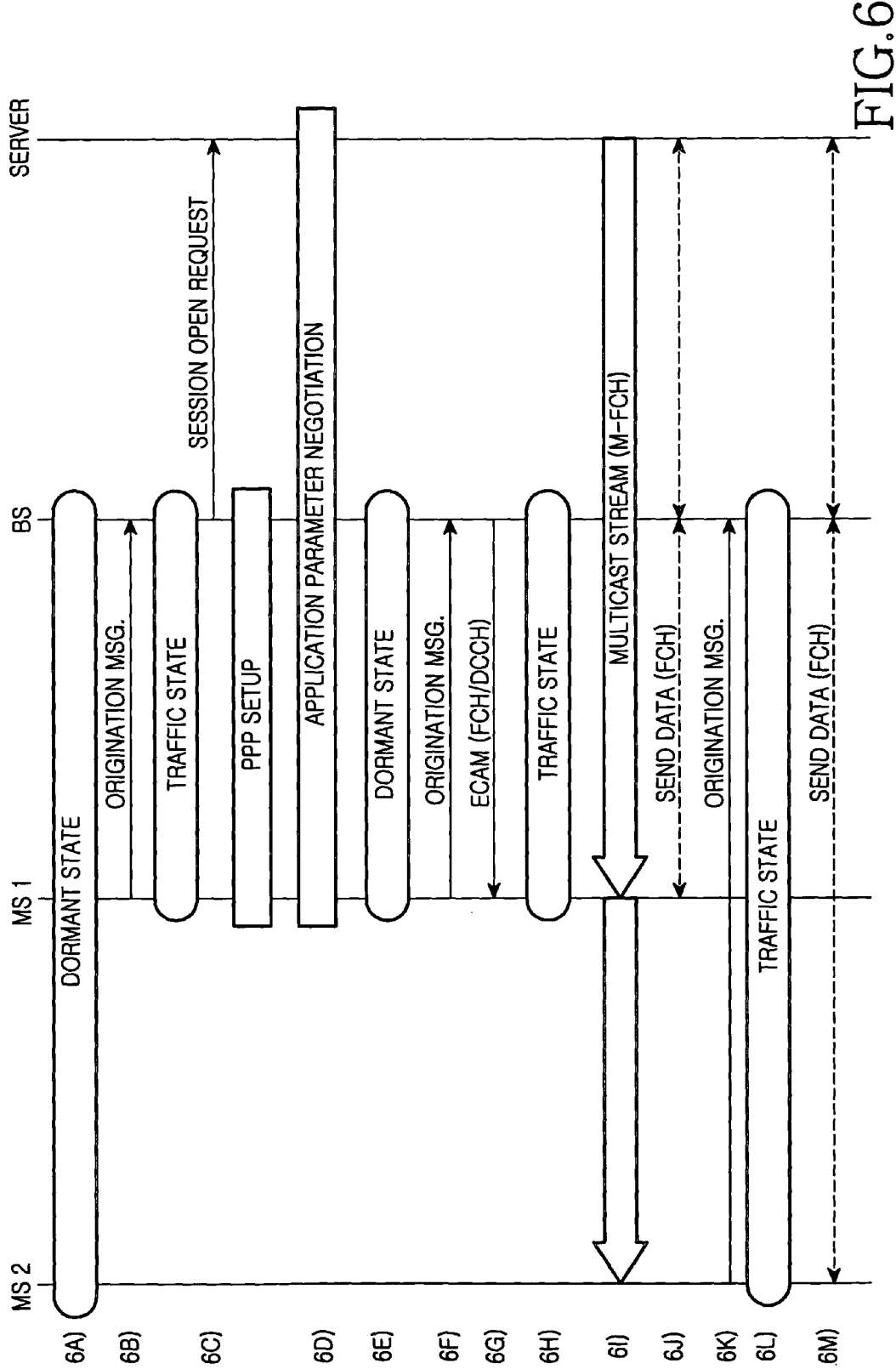
FIG. 6 illustrates a signal flow between a mobile station, a base station and a server for an interactive data service according to another embodiment of the present invention.

FIG. 6 illustrates a signal flow between a plurality of mobile stations, a base station, and a server for an interactive data service according to another embodiment of the present invention. This embodiment provides a procedure for transmitting reverse information of a corresponding mobile station by connecting all interactive traffic channels, so that several additional mechanisms are not required when only a reverse dedicated channel is connected. In the case of a real-time data service, a success of the service depends on how fast a connection is set up, and this factor is considered in this embodiment.

Referring to FIG. 6, in step 6A, a second mobile station (MS2) makes a transition to a dormant state after receiving service information. Steps 6B to 6D correspond to a procedure in which a first mobile station (MS1) connects a session to receive a corresponding service, and the procedure is the same as described above. After succeeding in opening a session, the first mobile station transitions to a dormant state in step 6E. If there is transmission data, the first mobile station transmits an origination message to the base station in step 6F. In step 6G, the base station assigns a forward dedicated channel and a reverse dedicated channel to the first mobile station, and in step 6H, the base station transitions to a traffic state. In step 6I, the first mobile station and the second mobile station receive a multicast stream, which is data for a broadcast service to be provided from a server via the base station, over a previously assigned forward common channel (M-FCH). In this situation, if there is transmission data, in step 6J, the first mobile station transmits the transmission data to the base station over a reverse dedicated channel, and receives response information for the transmission data from the base station over a forward dedicated channel. For example, the first mobile station receives such information as control information or ACK information for the reverse dedicated channel from the base station over the forward dedicated channel. Further, in this situation, if transmission data is generated and thus an origination message is transmitted to the base station in step 6K, the second mobile station transmits to a normal traffic state in step 6L, and then transmits transmission data in step 6M. After completion of data transmission, the first mobile station and the second mobile station transition to a dormant state or continue to receive a broadcast service. In this signal flow, while receiving a broadcast service over a common channel, a mobile station transmits transmission data over a reverse dedicated channel and receives corresponding data over a forward dedicated channel.

Figure 7:
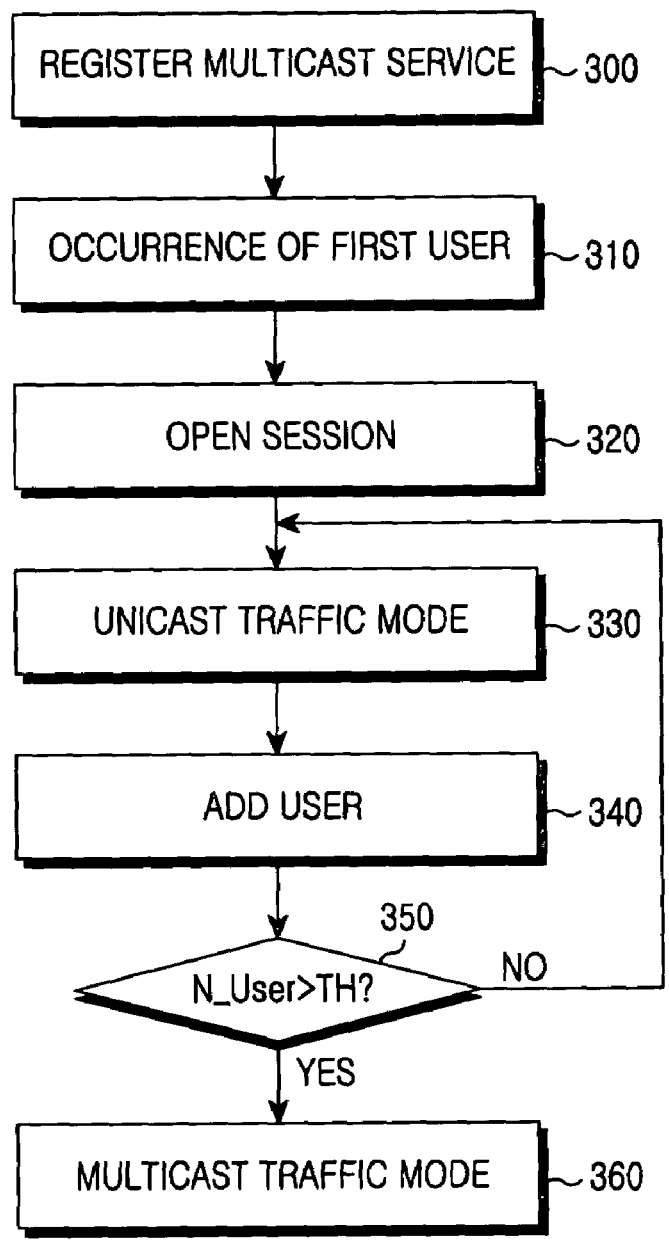
FIG. 7 illustrates a procedure for initiating an interactive data service according to an embodiment of the present invention.

FIG. 7 illustrates a procedure for initiating an interactive data service according to an embodiment of the present invention. This embodiment provides a service initiation and resource management method when a dedicated channel mode and a common channel mode are used together. In the case of a multicast service, a particular service is not always needed but a service desired by a user may newly occur, and this situation is considered in this embodiment.

Referring to FIG. 7, in step 300, mobile stations register a particular multicast service. The particular multicast service may be either a service previously approved by an operator, or a newly registered service. The registered service can be selectively transmitted only to a user subscribed to the corresponding service. If there is a first user desiring the corresponding service in step 310, a base station and a server connect a connection for the service and open a session for the corresponding service in step 320. In step 330, the base station operates a forward channel in a dedicated channel mode until a predetermined number or more of subscribers are connected. If a user is added in step 340, the server determines in step 350 whether the number of service users is larger than a threshold. If the number of service users is larger than a threshold, the base station can change in step 360 to a mode where a forward channel is used as a common channel. Because a common broadcast channel must use as much power as it can arrive at up to the cell boundary regardless of users, it will consume many resources. Therefore, if the number of users is lower than or equal to a predetermined number by appropriately setting a threshold, a dedicated channel is used as a forward channel to provide a corresponding service, and when there is no profit in using the dedicated channel the procedure transitions from the step 320 to the step 360 and uses a common channel as a forward channel to provide a corresponding service.

Figure 8:
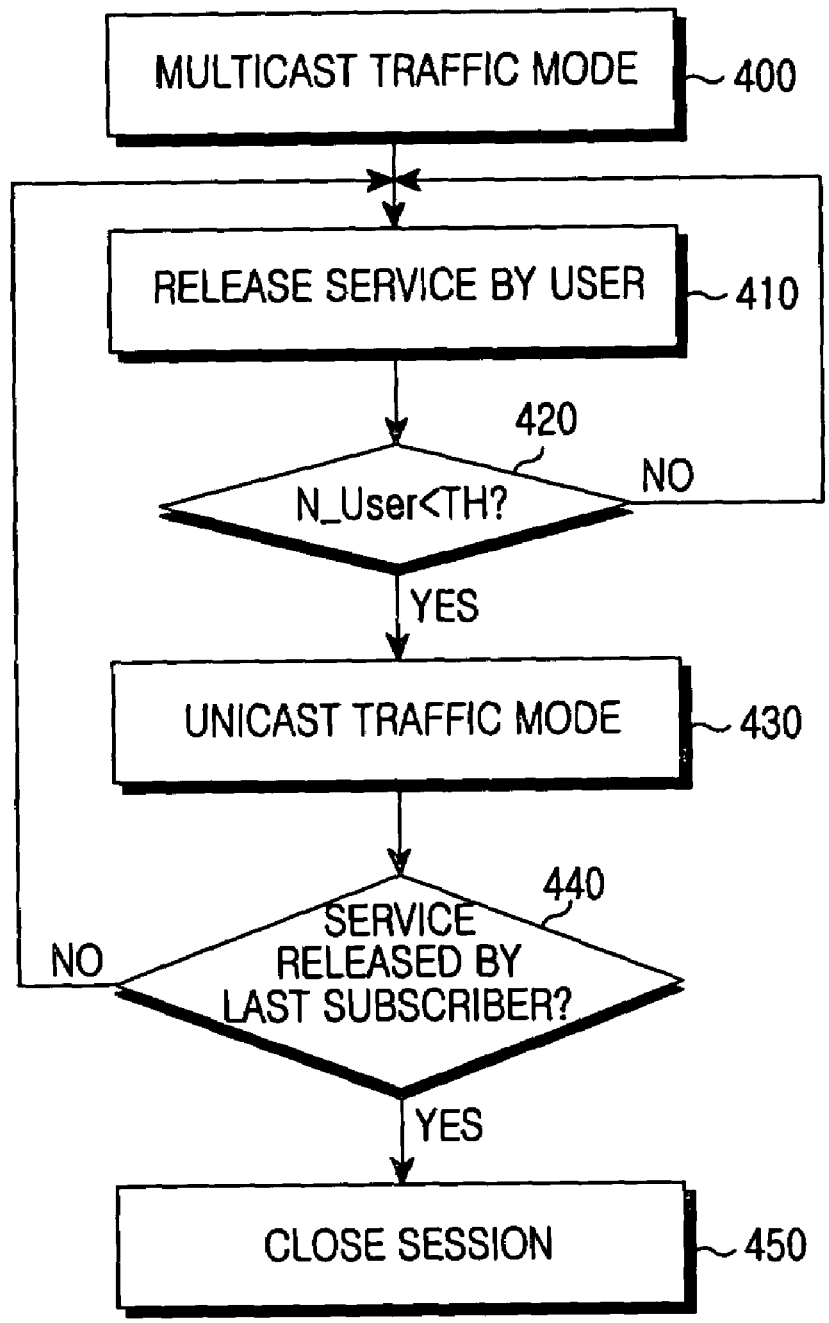
FIG. 8 illustrates a procedure for closing an interactive data service according to an embodiment of the present invention.

FIG. 8 illustrates a procedure for closing an interactive data service according to an embodiment of the present invention. This embodiment provides a service close and resource management method when a mode where a dedicated channel is used as a forward channel and a mode where a common channel is used as a forward channel are used together.

Referring to FIG. 8, in step 400, a plurality of users are receiving a service using a common channel. If a user sends a service release request in step 410, a server compares the number of mobile stations using the common channel with a threshold in step 420. If the number of mobile stations using the common channel is smaller than the threshold, a base station changes a common channel to a dedicated channel in step 430. The server determines in step 440 whether the last subscriber has released the service. If it is determined that the last user has closed the service, a session opened between the base station and the server is terminated in step 450.

Figure 9:
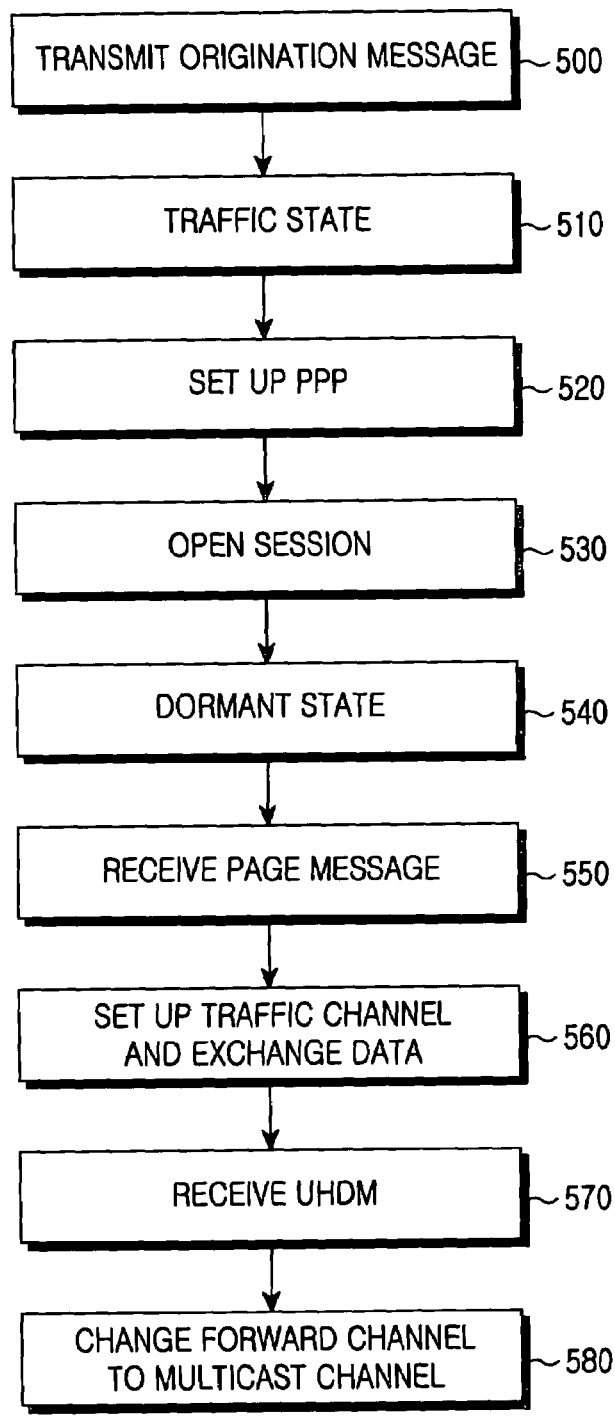
FIG. 9 illustrates a procedure for handling an interactive data service by a mobile station according to an embodiment of the present invention.

FIG. 9 illustrates a procedure for handling an interactive data service from the viewpoint of a mobile station according to an embodiment of the present invention. Referring to FIG. 9, in step 500, a mobile station, or a user, sends a service request to a base station along with an origination message in order to connect a particular interactive broadcast service. In step 510, the mobile station sets up a radio resource connection to the base station. As a result, the base station and the mobile station are in a normal traffic state, i.e., a state where a dedicated channel is used. In step 520, the mobile station and the base station set up PPP using the dedicated channel. In step 530, a session is opened between the mobile station and a server by the base station for the corresponding application service. This process is performed by requesting, by the service-requested base station, opening of a session to the server scheduled to perform the corresponding service. This session opening process is a process for creating a session for a new service when the mobile station is a first user desiring to receive the corresponding service. If the server accepts the session open request, a session between the mobile station and the server is opened. Here, "session is opened" means that a process of setting up an application layer's environment for a corresponding service by a mobile station has been completed.

In step 540, the mobile station transitions to a dormant state. Accordingly, all mobile stations registered in the service are in the dormant state. If a page message is received in step 550, the mobile station sets up a traffic channel to the base station and exchanges data by setting up a previously prepared application layer in step 560. Thereafter, while receiving forward data, the mobile station receives a UHDM message transmitted by the base station in step 570. The UHDM message is transmitted along with M-FCH over which forward broadcast information is transmitted, MAC_ID for identifying a mobile station and assigning a reverse link power control subchannel, information on a common power control channel CPCCH, and information on a common channel CACH. Upon successfully receiving the UHDM message, the base station changes a forward channel to a multicast channel (e.g., M-FCH) in step 580.

Figure 10:
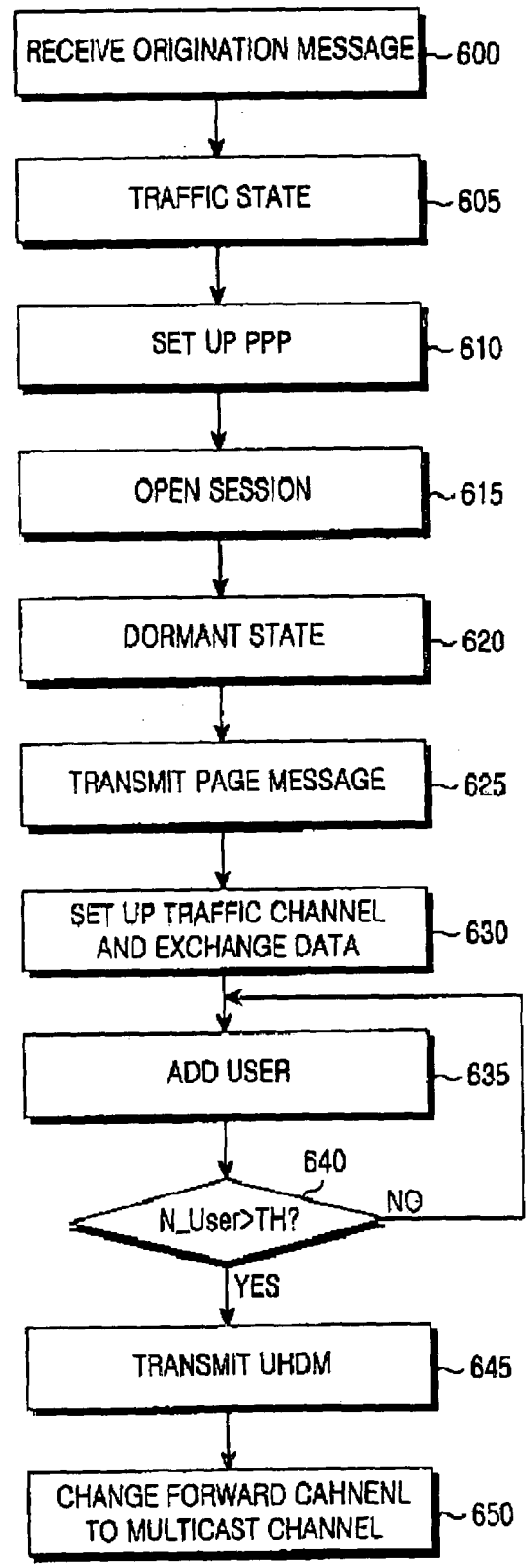
FIG. 10 illustrates a procedure for handling an interactive data service by a base station according to an embodiment of the present invention.

FIG. 10 illustrates a procedure for handling an interactive data service from the viewpoint of a base station according to an embodiment of the present invention. Referring to FIG. 10, in step 600, a base station receives an origination message transmitted by a mobile station, or a user, in order to connect a particular interactive broadcast service. In step 605, a radio resource connection is set up between the base station and a mobile station. At this point, transition to a normal traffic state occurs, i.e., a state where a dedicated channel is used. In step 610, the base station sets up PPP to the mobile station using the dedicated channel. In step 615, the base station opens a session between a server and the mobile station for a corresponding application service. Thereafter, in step 620, the base station releases a forward dedicated channel to the mobile station and transitions to a dormant state. In step 625, the base station, if notified by the server that a certain user initiated a service, transmits a page message to all registered mobile stations. In step 630, the base station transitions to a traffic state, and accordingly, a dedicated resource is set up. Thereafter, as a user is added to a corresponding cell in step 635, it is determined in step 640 whether the number of users in the cell is larger than a threshold TH. If the number of users in the cell is larger than the threshold TH, the base station transmits a UHDM message to the mobile station in step 645, in order to change a forward channel to a common channel. The UHDM message includes M-FCH, MAC_ID for identifying a mobile station and assigning a reverse link power control subchannel, information on a common power control channel CPCCH, and information on a common channel CACH. When the mobile station succeeds in receiving the UHDM message, the base mobile changes a forward channel to a multicast channel (e.g., M-FCH) in step 650.

When the interactive broadcast service according to an embodiment of the present invention is used, various types of application services are available. For example, a user can give an order for necessary goods while viewing a broadcast service, or participate in making the broadcast contents by reflecting his request in the broadcast, thereby enabling an interactive broadcast service. Alternatively, all users can receive the same contents including a user's comment on a service requested by the user. In this case, in the reverse direction, a dedicated channel is assigned according to mobile stations so that the mobile station can transmit data. Such a service is suitable to a zone-based service that provides a particular service to users gathering within a specific service area.

The term "session" stated above can be referred to as a virtual connection existing between one user and a server in an upper application layer for a service, and one session can be set up between a user and a server. The session provides a function capable of maintaining session identifier, creation time, session context, etc. In the invention, a procedure presented in a session description protocol (SDP) is performed in order to maintain such information between a server and a client.

In addition, a description will be made of a method for determining a threshold, which is a criterion for changing a dedicated channel to a common channel. For example, when data is transmitted over a dedicated channel at a data rate of 9.6 Kbps, subscribers receiving this service are provided with the same service contents. It is determined that when the number of users receiving dedicated channels is larger than or equal to which number, transmission over a dedicated channel is higher in transmission efficiency than transmission over a common channel at the same data rate. For example, if it is determined that when the number of users is larger than or equal to 5, transmission over a common channel is superior in performance to transmission over a dedicated channel, then this criterion is defined as a threshold, and this can be used as a reference point in changing to a common channel and a dedicated channel.

Figure 11A:
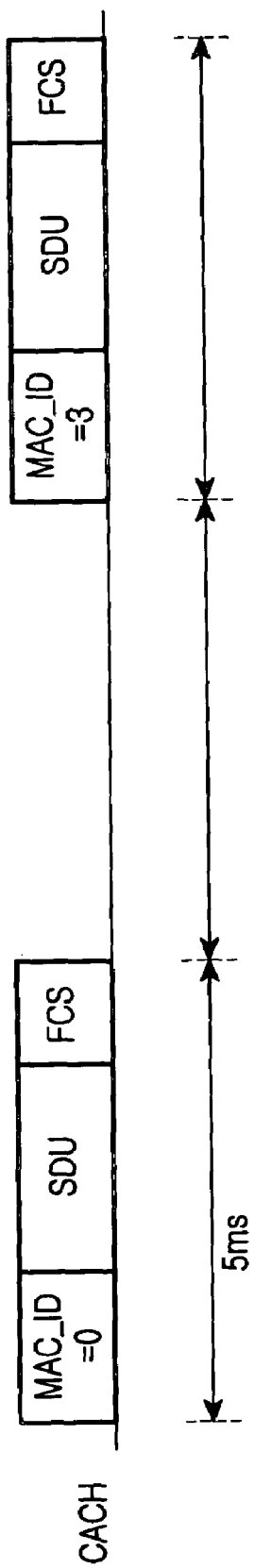
FIGS. 11A and 11B illustrate a transmission frame format of a common assignment channel used as a forward common channel for an interactive data service according to an embodiment of the present invention.
Figure 11B:
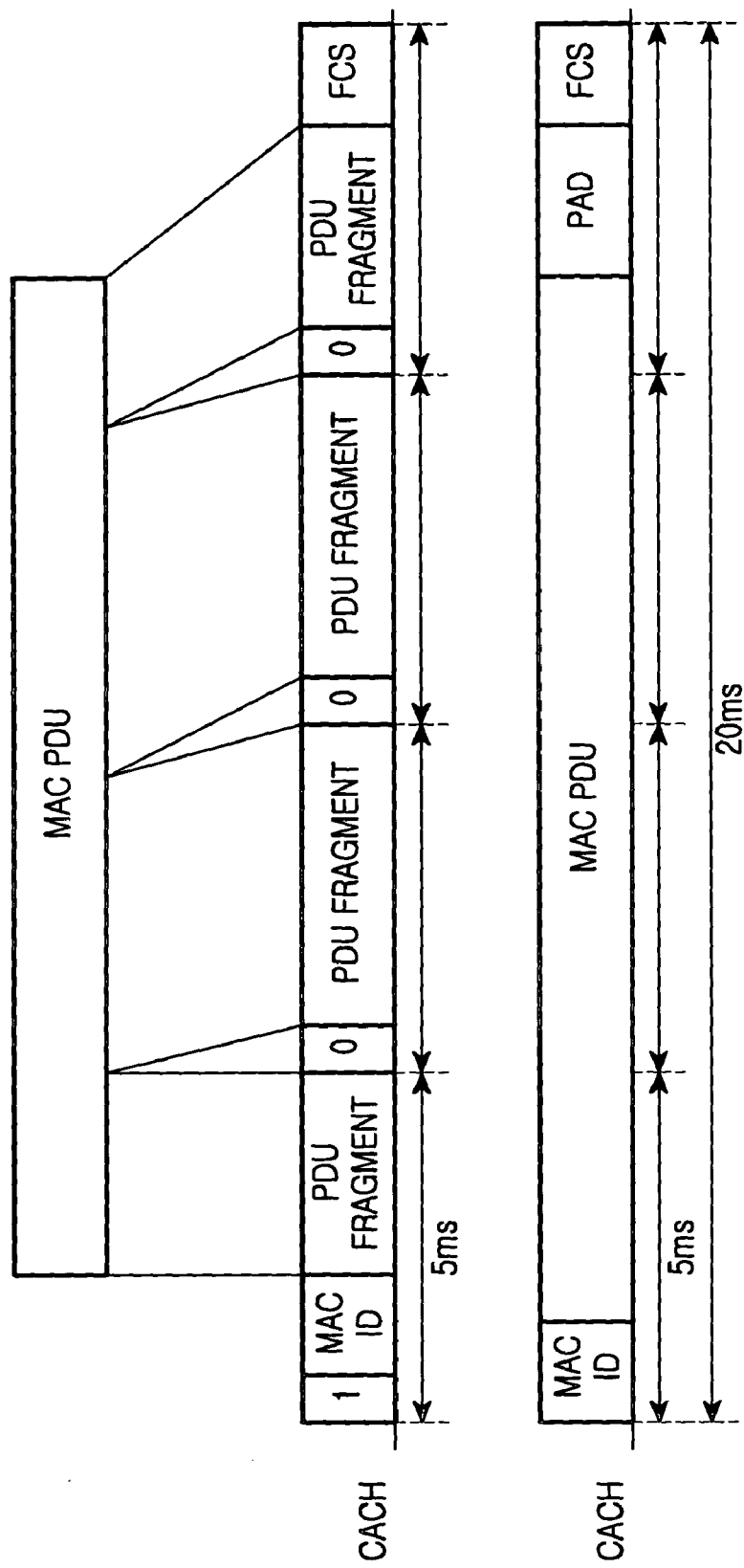

FIGS. 11A and 11B illustrate a transmission frame format of a common assignment channel (CACH) used as a forward common channel for an interactive data service according to an embodiment of the present invention. Specifically, FIGS. 11A and 11B illustrate when a common channel is assigned in a forward direction in a semi-traffic state. The common channel transmits only the data transmitted not to a specific user, but to all mobile stations, contained in a service according to an embodiment of the present invention. However, when an interactive broadcast service according to the invention is provided, a dedicated channel is used in the reverse direction. In this case, a path is required through which message information for controlling a reverse dedicated channel or ACK data, which is a response to the data transmitted in a reverse direction, is to be transmitted. To this end, a common assignment channel of IS2000 is used in the invention. In order to distinguish a user using an existing common assignment channel, such a value (8-bit MAC_ID) as a subchannel identifier of a common power control channel is used.

In FIG. 11A, an FCS or a 2-bit segment indicator, is added every 5 ms to indicate connection of a 5 ms segment, and consecutive 5 ms frames are used for transmission of a long message. In FIG. 11B, an FCS is repeatedly checked every 5 ms and 20 ms without a segment indicator, and 5 ms and 20 ms frames are distinguished based on whether the check is passed. In this manner, a frame transmitted over a common assignment channel can become either 5 ms or 20 ms in length.

Figure 12A:
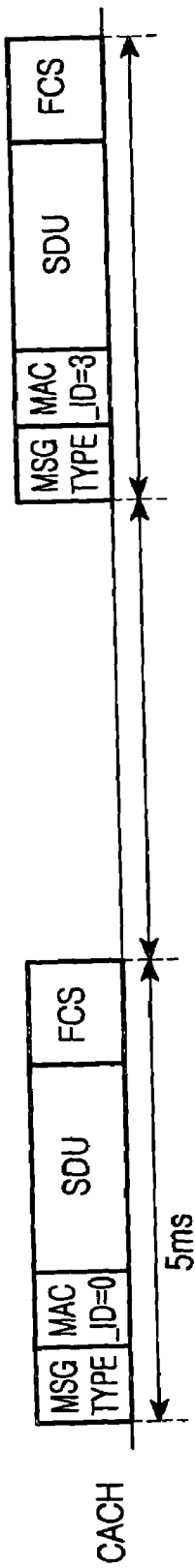
FIGS. 12A and 12B illustrate a transmission frame format of a common assignment channel used as a forward common channel for an interactive data service according to an embodiment of the present invention.
Figure 12B:
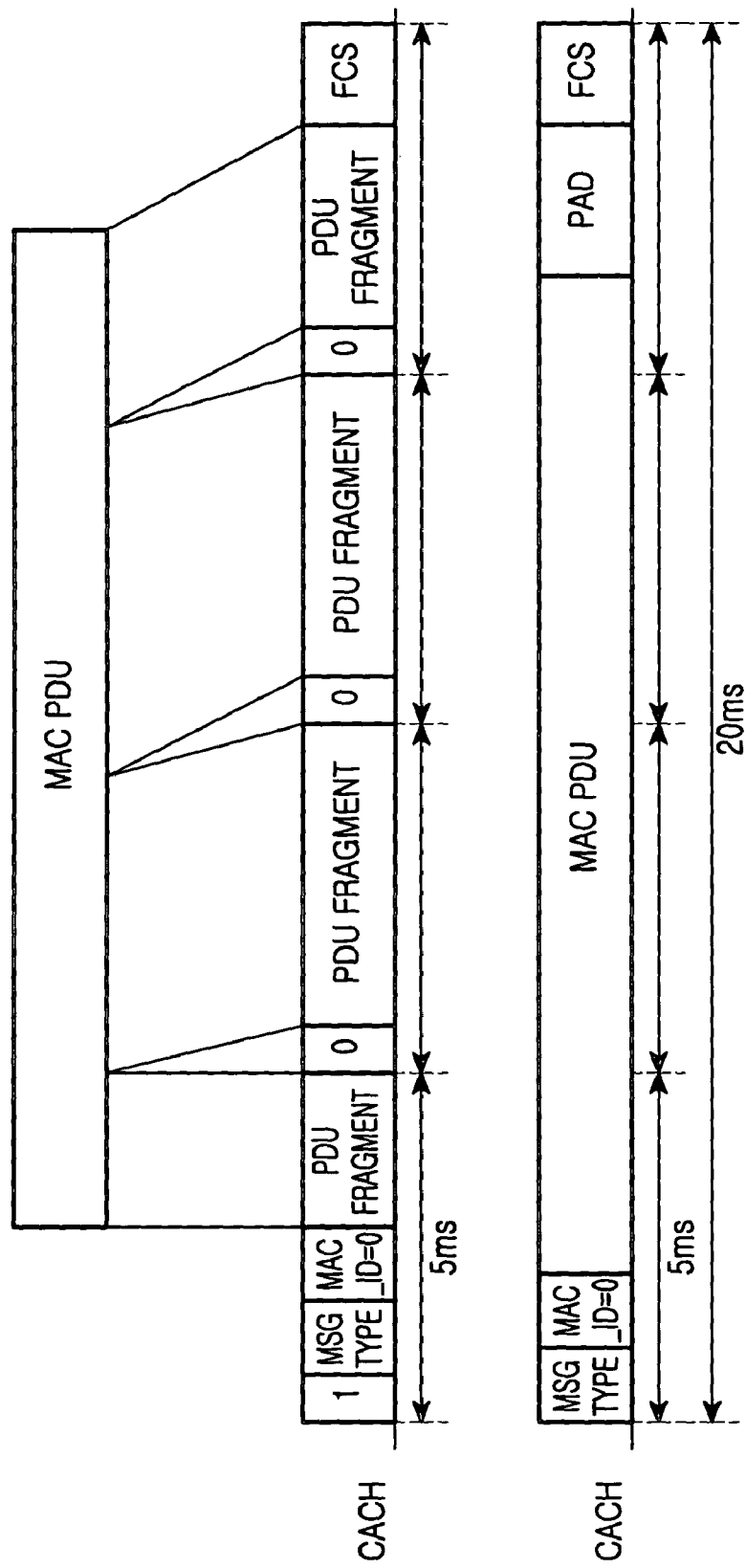

FIGS. 12A and 12B illustrate a transmission frame format of a common assignment channel (CACH) used as a forward common channel for an interactive data service according to an embodiment of the present invention. Specifically, FIGS. 12A and 12B illustrate a method of changing a frame format in transmitting a message over a common assignment message. To this end, a frame format for a common assignment channel of IS2000 is used. In order to distinguish a user using an existing common assignment channel, such a value as a subchannel identifier of a common power control channel is used to distinguish a mobile station. In order to use a conventionally presented frame format, an existing format with an MSG_TYPE field arranged in the foremost thereof is used. In a newly proposed frame format, MSG_TYPE can distinguish only a 5 ms message. However, in the invention, it is possible to distinguish a 20 ms message by using MSG_TYPE=11. In addition, a message of each user can be identified using MAC_ID.

Table 3 below shows an example of a channel assignment message used in the invention.

TABLE 3

| Message | MSG_TYPE (binary) | Maximum number of bits in L3 PDU |
|---|---|---|
| EACAM | 000 | N/A |
| PCCAM | 001 | N/A |
| MRSCAMM | 01 | 14 |
| Reserved | 10 | |
| ENC_IND | 11 | Variable(L3 Message) |

In Table 3, EACAM (Early Acknowledgement Channel Assignment Message)/PCCAM (Power Control Channel Assignment Message) is a channel assignment message needed in a reservation access mode, and MRSCAMM (MAC Reverse Supplemental Mini Message) is a message for rapid transmission of a reverse supplemental channel. ENC_IND is a message type proposed in the invention, and ENC_IND=11 indicates that a 20 ms L3 message is included.

As discussed above, the present invention uses a broadcast/multicast-type shared (or common) channel for forward transmission and a dedicated channel for reverse transmission in an interactive data service, thereby enabling interactive communication between a mobile station and a base station. In an existing broadcast service, a service for transmitting information from a mobile station to a base station is not provided. However, if an interactive data service using a common channel is provided, text and voice provided from a mobile station can be transmitted to another user on a real-time basis, thus providing an improved service distinguishable from the existing unidirectional broadcast service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for providing an interactive broadcast/multicast service for high-speed data transmission between a base station and at least one mobile station in a mobile communication system including the at least one mobile station, the base station communicating with the at least one mobile station, and a server connected to the base station, the server providing data to the at least one mobile station, the method comprising the steps of:

transmitting, by the base station, high-speed data according to the interactive broadcast/multicast service transmitted from the server, to the at least one mobile station over a forward common channel all mobile stations can receive in common during the interactive broadcast/multicast service; and transmitting reverse transmission data according to the interactive broadcast/multicast service over a reverse dedicated channel, by a serviced mobile station, receiving the interactive broadcast/multicast service through the forward common channel during the interactive broadcast/multicast service, wherein the base station assigns a common power control channel (CPCCH) to the at least one mobile station to control power of the reverse dedicated channel.

2. The method of claim 1, wherein the base station provides a broadcast service through the forward common channel.

3. The method of claim 1, wherein the base station transmits to the at least one mobile station assignment information of a multicast fundamental channel for transmitting forward broadcast information, assignment information of a common assignment channel for transmitting a response message for reverse data, assignment information of the CPCCH for transmitting power control information of the reverse dedicated channel, and assignment information for identifying the serviced mobile station and assigning a reverse power control channel.

4. The method of claim 3, wherein the base station transmits reverse power control information to the at least one mobile station over the CPCCH.

5. The method of claim 3, wherein the serviced mobile station transmits a power control bit to the base station over the reverse dedicated channel as power control information for one of the CPCCH, a forward dedicated control channel, and the common assignment channel.

6. The method of claim 1, further comprising the step of transmitting, from the base station to the at least one mobile station, reverse power control information via the CPCCH and forward data via a forward dedicated control channel.

7. The method of claim 1, further comprising the step of transmitting, from the base station to the at least one mobile station reverse power control information via the CPCCH and a control message to be delivered to a particular mobile station or a response message for reverse data via a time-sharing common assignment channel or dedicated control channel.

8. The method of claim 1, further comprising the step of setting up, from the mobile station to the base station, a reverse fundamental channel, a dedicated control charnel, and a supplemental channel.

9. A method for providing an interactive broadcast/multicast service for high-speed data transmission between a base station and at least one mobile station in a mobile communication system including a plurality of mobile stations, the base station communicating with the plurality of mobile stations, and a server connected to the base station, the server providing data to the plurality of mobile stations, the method comprising the steps of:

upon receiving an interactive broadcast/multicast service request from at least one of the plurality of mobile stations, setting up, by the base station, a connection to the at least one of the plurality of mobile stations and opening a session for the requested interactive broadcast/multicast service between the base station and the server;

transmitting, by the base station, high-speed data according to the interactive broadcast/multicast service transmitted from the server, to the at least one of the plurality of mobile stations over a forward dedicated channel during the interactive broadcast/multicast service;

comparing, by the server, a number of the at least one of the plurality of mobile stations requesting the interactive broadcast/multicast service with a predetermined threshold; and if the number of the at least one of the plurality of mobile stations requesting the interactive broadcast/multicast service is larger than the predetermined threshold, simultaneously transmitting, by the base station, high-speed data to be provided from the server to the at least one of the plurality of mobile stations, to at least one of the plurality of mobile stations over a forward common channel during the interactive broadcast/multicast service, and transmitting reverse transmission data according to the interactive broadcast/multicast service over respective reverse dedicated channels by the at least one of the plurality mobile stations receiving the interactive broadcast/multicast service through the forward common channel during the interactive broadcast/multicast service, wherein the base station assigns a common power control channel (CPCCH) to the at least one mobile station to control power of the reverse dedicated channel.

10. The method of claim 9, wherein the base station provides a broadcast service through the forward common channel.

11. The method of claim 9, wherein the base station transmits information for changing a forward data transmission channel from a dedicated channel to a common channel and a handoff direction message, to the at least one of the plurality of mobile stations.

12. The method of claim 11, wherein the handoff direction message includes multicast fundamental channel assignment information, common assignment channel assignment information for transmitting a response message for reverse data, common power control channel assignment information for transmitting power control information of a reverse dedicated channel, and information for identifying the mobile station requesting the service and assigning a reverse power control channel.

13. The method of claim 11, wherein the base station transmits reverse power control information to the at least one of the plurality of mobile stations over the CPCCH.

14. The method of claim 12, wherein the mobile station requesting the service transmits a power control bit to the base station over a reverse dedicated channel as power control information for one of the CPCCH, a forward dedicated control channel, and a common assignment channel.

15. The method of claim 9, wherein the base station transmits to the at least one of the plurality of mobile stations a release command message for changing a data transmission channel from the base station to the mobile station, from a dedicated channel to a common channel.

16. A method for releasing an interactive broadcast/multicast service for high-speed data transmission between a base station and a mobile station in a mobile communication system including a plurality of mobile stations, the base station communicating with the plurality of mobile stations, and a server connected to the base station, comprising the steps of:

transmitting, by the base station, high-speed data according to the interactive broadcast/multicast service to be transmitted from the server to the plurality of mobile stations, to at least one of the plurality of mobile stations over a forward common channel, and transmitting reverse transmission data according to the interactive broadcast/multicast service over respective reverse dedicated channels by at least one of the plurality of mobile stations receiving the interactive broadcast/multicast service through the forward common channel during the interactive broadcast/multicast service;

comparing, by the sewer, a number of the at least one of the plurality of mobile stations receiving the interactive broadcast/multicast service with a predetermined threshold, while providing the high-speed data;

if the number of the at least one of the plurality of mobile stations receiving the high-speed data provided over the forward common channel is smaller than the threshold, transmitting by the base station high-speed data to be provided from the server to at least one of the plurality of mobile stations requesting the interactive broadcast/multicast service over a forward dedicated channel during the interactive broadcast/multicast service; and releasing, by the base station, a session opened for the interactive broadcast/multicast service between the base station and the server, if all of the at least one of the plurality of mobile stations receiving the service finish the interactive broadcast/multicast service reception, wherein the base station assigns a common power control channel (CPCCH) to the at least one mobile station to control power of the reverse dedicated channel.

17. The method of claim 16, wherein the base station provides a broadcast service through the forward common channel.

18. A method for providing an interactive broadcast/multicast service for high-speed data transmission between a base station and a plurality of mobile stations in a mobile communication system including the plurality of mobile stations, the base station communicating with the plurality of mobile stations, and a server connected to the base station, comprising the steps of:

upon receiving an interactive broadcast/multicast service request from a first mobile station, setting up, by the base station, a connection to the first mobile station, and shifting a state with the first mobile station to a traffic state;

opening, by the base station, a session for the requested interactive broadcast/multicast service between the base station and the server, registering the first mobile station in the requested interactive broadcast/multicast service, and shifting the state with the first mobile station to a dormant state;

upon receiving an interactive broadcast/multicast service request from a second mobile station in the dormant state, paging, by the server, the first mobile station via the base station;

assigning, by the base station, a forward common channel and a reverse dedicated channel between the base station and the first mobile station; and transmitting, by the base station, high-speed data according to the interactive broadcast/multicast service transmitted from the server, to the first mobile station over the assigned forward common channel, and transmitting, by the first mobile station, reverse transmission data according to the interactive broadcast/multicast service to be transmitted in a reverse direction over the assigned reverse dedicated channel during the interactive broadcast/multicast service, wherein the base station assigns a common power control channel (CPCCH) to the at least one mobile station to control power of the reverse dedicated channel.

19. A method for providing an interactive broadcast/multicast service for high-speed data transmission between a base station and a mobile station in a mobile communication system including the mobile station, the base station communicating with the mobile station, and a server connected to the base station, comprising the steps of:

setting up, by the base station, a connection to the mobile station and shifting a state with the mobile station to a traffic state, if a data transmission request corresponding to the interactive broadcast/multicast service to the server is received from the mobile station receiving high-speed data provided from the server, from the base station over a forward common channel;

opening, by the base station, a session for the requested data transmission between the base station and the server;

assigning, by the base station, a reverse dedicated channel between the base station and the mobile station; and transmitting, by the mobile station, high-speed data according to the interactive broadcast/multicast service to be transmitted in a reverse direction, over the assigned reverse dedicated channel during the interactive-broadcast/multicast service, wherein the base station assigns a common power control channel (CPCCH) to the at least one mobile station to control power of the reverse dedicated channel.

20. The method of claim 19, wherein the base station provides a broadcast service through the forward common channel.

21. A method for providing an interactive broadcast/multicast service for high-speed data transmission between a base station and a mobile station in a mobile communication system including the mobile station, the base station communicating with the mobile station, and a server connected to the base station, comprising the steps of:

receiving, by the mobile station, radio resource information for the interactive broadcast/multicast service from the base station;

sending, by the mobile station, an interactive broadcast/multicast service request to the base station using the received radio resource information;

setting up, by the base station, a connection to the mobile station, and shifting a state with the mobile station to a traffic state;

opening, by the base station, a session for the requested interactive broadcast/multicast service between the base station and the server;

assigning, by the base station, a forward common channel and a reverse dedicated channel between the base station and the mobile station;

transmitting, by the base station, high-speed data according to the interactive broadcast/multicast service to be provided from the server to the mobile station, to the mobile station over the assigned forward common channel during the interactive broadcast/multicast service; and transmitting, by the mobile station, reverse transmission data according to the interactive broadcast/multicast service to be provided from the mobile station to the server, to the base station over the assigned reverse dedicated channel during the interactive broadcast/multicast service, wherein the base station assigns a common power control channel (CPCCH) to the at least one mobile station to control power of the reverse dedicated channel.

22. The method of claim 21, wherein the base station provides a broadcast service through the forward common channel.

23. The method of claim 21, wherein the radio resource information comprises logical-to-physical mapping (LPM) information, multiplexing rule information, and multicast service reference identifier (MSR_ID) information according to multicast fundamental channels (M-FCH).

24. A method for providing an interactive-broadcast/multicast service for high-speed data transmission between a base station and at least one mobile station in a mobile communication system including the at least one mobile station, the base station communicating with the at least one mobile station, and a server connected to the base station, the server providing data to the at least one mobile station, the method comprising the steps of:

transmitting, by the base station, high-speed data according to the interactive broadcast/multicast service transmitted from the server that includes at least one segment indicator indicating a segment size of frames used for the high-speed data, to the at least one mobile station over a forward common channel all mobile stations can receive in common during the interactive broadcast/multicast service; and transmitting reverse transmission data according to the interactive broadcast/multicast service over a reverse dedicated channel, by a serviced mobile station, receiving the interactive broadcast/multicast service though the forward common channel during the interactive broadcast/multicast service, wherein the base station assigns a common power control channel (CPCCH) to the at least one mobile station to control power of the reverse dedicated channel.

\* \* \* \* \*